US008509138B2

(12) United States Patent
Choi et al.

(10) Patent No.: US 8,509,138 B2
(45) Date of Patent: Aug. 13, 2013

(54) METHOD OF DESIGNING A MULTIPLEXING STRUCTURE FOR RESOURCE ALLOCATION TO SUPPORT LEGACY SYSTEM

(75) Inventors: Jin Soo Choi, Anyang-Si (KR); Han Gyu Cho, Anyang-Si (KR); Jong Young Han, Anyang-Si (KR); Jae Hoon Chung, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 349 days.

(21) Appl. No.: 12/850,430

(22) Filed: Aug. 4, 2010

(65) Prior Publication Data

US 2010/0316014 A1 Dec. 16, 2010

Related U.S. Application Data

(63) Continuation of application No. 12/426,524, filed on Apr. 20, 2009.

(60) Provisional application No. 61/046,779, filed on Apr. 21, 2008, provisional application No. 61/055,471, filed on May 23, 2008, provisional application No. 61/056,427, filed on May 27, 2008, provisional application No. 61/056,835, filed on May 29, 2008.

(30) Foreign Application Priority Data

Apr. 10, 2009 (KR) ........................ 10-2009-0031268

(51) Int. Cl.
*H04J 3/00* (2006.01)
*H04J 3/16* (2006.01)
*H04W 4/00* (2009.01)

(52) U.S. Cl.
USPC ............ 370/314; 370/329; 370/336; 370/468

(58) Field of Classification Search
USPC ................. 370/314–329, 280–294, 336–344, 370/455–468; 375/254–260, 267–295; 455/335–478

See application file for complete search history.

(56) References Cited

U.S. PATENT DOCUMENTS 7,630,356 B2 * 12/2009 Zhang et al. .................. 370/344
7,724,777 B2 * 5/2010 Sutivong et al. .............. 370/478

(Continued)

FOREIGN PATENT DOCUMENTS

CN 101115271 A 1/2008
JP 2006-74325 A 3/2006

(Continued)

OTHER PUBLICATIONS

Motorola, "EUTRA SC-FDMA Uplink Resource Block, Resource Allocation and Pilot/Reference Signal Design & TP", 3GPP TSG RAN1 LTE Ad Hoc, R1-060246, 3rd Generation Partnership Project (3GPP), vol. RAN WG1, Jan. 26, 2006, XP050417574.

(Continued)

*Primary Examiner* — Man Phan
(74) *Attorney, Agent, or Firm* — Birch, Stewart, Kolasch & Birch, LLP

(57) ABSTRACT

New multiplexing UL structures for supporting legacy system are provided. A 16m system of diversity mode can be multiplexed with 16e system in PUSC mode in FDM manner with the same tiles/permutation rules. A 16m system can be multiplexed with 16e system in AMC mode in FDM and/or TDM manner. The time length of multiplexed 16e PUSC packets and/or 16m packets can be extended to more than two sub-frames for UL coverage. A PRU for 16m system may consists of 16 sub-carriers by 6 OFDM symbols, 18 sub-carriers by 6 OFDM symbols, or 20 sub-carriers by 6 OFDM symbols.

12 Claims, 21 Drawing Sheets

(56) References Cited

U.S. PATENT DOCUMENTS

| | | | |
|---|---|---|---|
| 8,023,466 B2* | 9/2011 | Ma et al. | 370/331 |
| 2006/0046643 A1 | 3/2006 | Izumikawa et al. | |
| 2007/0280292 A1* | 12/2007 | Lee et al. | 370/468 |
| 2008/0117867 A1* | 5/2008 | Yin et al. | 370/329 |
| 2008/0205364 A1* | 8/2008 | Park et al. | 370/338 |
| 2008/0232319 A1* | 9/2008 | Son et al. | 370/329 |
| 2008/0292015 A1* | 11/2008 | Lee | 375/260 |
| 2009/0257406 A1* | 10/2009 | Sankar et al. | 370/336 |
| 2010/0031110 A1* | 2/2010 | Seok et al. | 714/748 |
| 2010/0046464 A1* | 2/2010 | Kwak et al. | 370/330 |
| 2010/0177715 A1 | 7/2010 | Ofuji et al. | |
| 2010/0189049 A1* | 7/2010 | Lim et al. | 370/329 |

FOREIGN PATENT DOCUMENTS

| | | |
|---|---|---|
| JP | 2008-85910 A | 4/2008 |
| RU | 2216105 C2 | 11/2003 |
| WO | WO 02/33848 A2 | 4/2002 |
| WO | WO 2004/032443 A1 | 4/2004 |
| WO | WO 2005/099290 A1 | 10/2005 |
| WO | WO 2006/009715 A1 | 1/2006 |
| WO | WO 2006/096007 A1 | 9/2006 |
| WO | WO 2006/130742 A1 | 12/2006 |
| WO | WO 2007/111456 A2 | 10/2007 |
| WO | WO 2007/120017 A2 | 10/2007 |
| WO | WO 2007/133034 A2 | 11/2007 |
| WO | WO 2007/142858 A2 | 12/2007 |
| WO | WO 2008/018711 A2 | 2/2008 |
| WO | WO 2008/023645 A1 | 2/2008 |
| WO | WO 2008/044888 A1 | 4/2008 |

OTHER PUBLICATIONS

IEEE, "IEEE Standard for Local Metropolitan Area Networks; Part 16: Air Interface for Fixed and Mobile Broadband Wireless Access Systems; Amendment 2: Physical and Medium Access Control . . . ", IEEE Std 802.16e-2005 and IEEE Std 802.16-2004/Cor1-2005, Jan. 1, 2006, XP017603857.

* cited by examiner

METHOD OF DESIGNING A MULTIPLEXING STRUCTURE FOR RESOURCE ALLOCATION TO SUPPORT LEGACY SYSTEM

CROSS REFERENCE TO RELATED APPLICATIONS

This application is a Continuation of co-pending application Ser. No. 12/426,524, filed on Apr. 20, 2009, and claims priority to U.S. Provisional Application Nos. 61/046,779 filed Apr. 21, 2008, 61/055,471 filed May 23, 2008, 61/056,427 filed May 27, 2008, and 61/056,835 filed May 29, 2008. This Application also claims priority under 35 U.S.C. §119 on Korean Application No. 10-2009-0031268 filed Apr. 10, 2009. The entire contents of all related applications are incorporated herein by reference.

BACKGROUND OF THE INVENTION

1. Field of the Invention

The present invention relates to a method of designing multiplexing structures for resource allocation to support legacy system, specifically relates to uplink resource unit.

2. Discussion of the Background Art

The 802.16m amendment has been developed in accordance with the P802.16 project authorization request (PAR), as approved on 6 Dec. 2006, and with the Five Criteria Statement in IEEE 802.16-06/055r3. According to the PAR, the standard may be developed as an amendment to IEEE Std. 802.16. The 802.16m amendment may provide continuing support for legacy WirelessMAN-OFDMA equipment.

In a conventional IEEE 802.16e system, a basic slot structure and data region is Access) PHY requires both time and sub-channel dimension for completeness and serves as the minimum possible data allocation unit. The definition of an OFDMA slot depends on the OFDMA symbol structure, which varies for UL (UpLink) and DL (DownLink), for FUSC (Full Usage of Sub-Channels) and PUSC (Partial Usage of Sub-Channels), and for the distributed sub-carrier permutations and the adjacent sub-carrier permutation (AMC).

For DL FUSC and DL optional FUSC using the distributed sub-carrier permutation, one slot is one sub-channel by one OFDMA symbol. For DL PUSC using the distributed sub-carrier permutation, one slot is one sub-channel by two OFDMA symbols. For UL PUSC using either of the distributed sub-carrier permutations and for DL TUSC1 (Tile Use of Sub-Channels 1) and TUSC2, one slot is one sub-channel by three OFDMA symbols. For the adjacent sub-carrier permutation (AMC), one slot is one sub-channel by two, three, or six OFDMA symbols.

In OFDMA, a data region is a two-dimensional allocation of a group of contiguous sub-channels, in a group of contiguous OFDMA symbols. All the allocation refers to logical sub-channels. A two-dimensional allocation may be visualized as a rectangle, such as shown in FIG. 1.

In the related art, basic data allocation structures and/or pilot structures are different according to permutation rules such as PUSC, FUSC, AMC, etc. This is because permutation rules were separated in the time axis in the related art 16e system so that the structures were designed to be optimized according to each permutation rule. FIG. 2 shows an exemplary related art data allocation structure. Permutation rules are separated in time axis in the related art method. However, if more than one permutation rules exist on the same sub-frame, one unified basic data allocation structure and pilot transmission structure are required.

When multiplexing 16e system and 16m system, it is desirable to design time-frequency granularity of a PRU of a 16m system so that the PRU of the 16m system is compatible with a 16e system. In addition, it is desirable to design multiplexing structures such that performance deterioration of each of the 16e and the 16m system, which are multiplexed together, be made as low as possible.

SUMMARY OF THE INVENTION

Technical problems addressed by the present invention is in providing 16m and 16e multiplexing structures that provide optimum performance of legacy system and new systems, and in providing unified basic data allocation structure and/or pilot transmission structure.

To solve the technical problem, a novel and useful 16m and 16e multiplexing structure is provided in various forms according to the present invention. Further, a unified basic data allocation structure and/or pilot transmission structure is provided for a communication system adopting different permutation rules separated in frequency axis.

In one aspect of the invention, there is a method of communicating data between a mobile communication device and a base station. The method includes frequency multiplexing a tile of a first communication mode with a tile of a second communication mode to create a frequency multiplexed sub-frame. The tile of the first communication mode comprises $X_1$ contiguous subcarriers and $Y_1$ contiguous OFDMA symbols. The tile of the second communication mode comprises $X_2$ contiguous subcarriers and $Y_2$ contiguous OFDMA symbols. X1=X2 and Y2 is a multiple of Y1.

In one aspect of the invention, the multiple is an integer multiple (e.g., 2, such that X1=X2=4, Y1=3, and Y2=6).

In one aspect of the invention, the first communication mode includes PUSC (Partial Usage of Sub-Channels) sub-channelization.

In one aspect of the invention, the second communication mode includes tile permutation.

In one aspect of the invention, the method further includes time division multiplexing the frequency multiplexed sub-frame with a second sub-frame of a third communication mode, where the third communication mode may include adjacent sub-carrier permutation (AMC) or distributed sub-carrier permutation.

In one aspect of the invention, the method includes frequency multiplexing a Physical Resource Unit (PRU) of a third communication mode with a PRU of a fourth communication mode to create a second frequency multiplexed sub-frame; and time division multiplexing the frequency multiplexed sub-frame with the second frequency multiplexed sub-frame. The PRU of the third communication mode includes $X_3$ contiguous subcarriers and $Y_3$ contiguous OFDMA symbols. The PRU of the fourth communication mode includes $X_4$ contiguous subcarriers and $Y_4$ contiguous OFDMA symbols. X3=X4 and Y4 is a multiple of Y3 (e.g., x3=18, y3=3, and y4=6.)

In one aspect of the invention, the third communication mode includes adjacent sub-carrier permutation (AMC), and the fourth communication mode comprises distributed sub-carrier permutation.

In another aspect of the invention, there is a method of communicating data between a mobile communication device and a base station. The method includes frequency demultiplexing a frequency multiplexed sub-frame to form a tile of a first communication mode and a tile of a second communication mode. The tile of the first communication mode comprises $X_1$ contiguous subcarriers and $Y_1$ contiguous OFDMA symbols. The tile of the second communication mode comprises $X_2$ contiguous subcarriers and $Y_2$ contiguous OFDMA symbols. X1=X2 and Y2 is a multiple of Y1.

In another aspect of the invention, there is a mobile communication device configured to wirelessly communicate with a base station. The mobile communication device includes a RF unit; and a processor operatively connected to the RF unit and configured to frequency multiplex a tile of a first communication mode with a tile of a second communication mode to create a frequency multiplexed sub-frame. The tile of the first communication mode comprises $X_1$ contiguous subcarriers and $Y_1$ contiguous OFDMA symbols. The tile of the second communication mode comprises $X_2$ contiguous subcarriers and $Y_2$ contiguous OFDMA symbols. X1=X2 and Y2 is a multiple of Y1.

In another aspect of the invention, there is a base station configured to wirelessly communicate with a mobile communication device. The base station includes a RF unit; and a processor operatively connected to the RF unit and configured to frequency demultiplex a frequency multiplexed sub-frame to form a tile of a first communication mode and a tile of a second communication mode. The tile of the first communication mode comprises $X_1$ contiguous subcarriers and $Y_1$ contiguous OFDMA symbols. The tile of the second communication mode comprises $X_2$ contiguous subcarriers and $Y_2$ contiguous OFDMA symbols. X1=X2 and Y2 is a multiple of Y1.

With the multiplexing scheme and/or the data allocation structure of the present invention, the negative interaction between a legacy system and a new system is minimized.

DESCRIPTION OF THE DRAWINGS

The accompanying drawings, which are included to provide a further understanding of the invention, illustrate embodiments of the invention and together with the description serve to explain the principle of the invention.

In the drawings:

FIG. 4 shows an exemplary logical multiplexing structure according to one embodiment of the present invention.

FIG. 5 shows an exemplary logical multiplexing structure according to one embodiment of the present invention.

DETAILED DESCRIPTION OF THE INVENTION

Figure 1:
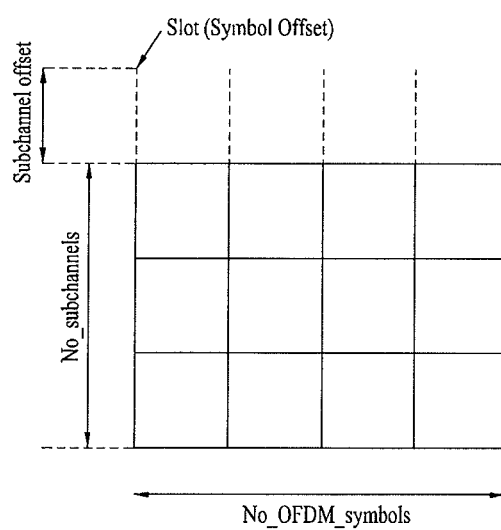
FIG. 1 shows a diagram for comparing performance in terms of diversity gain according to combinations of packet sizes and available bandwidths for a user.
Figure 2:
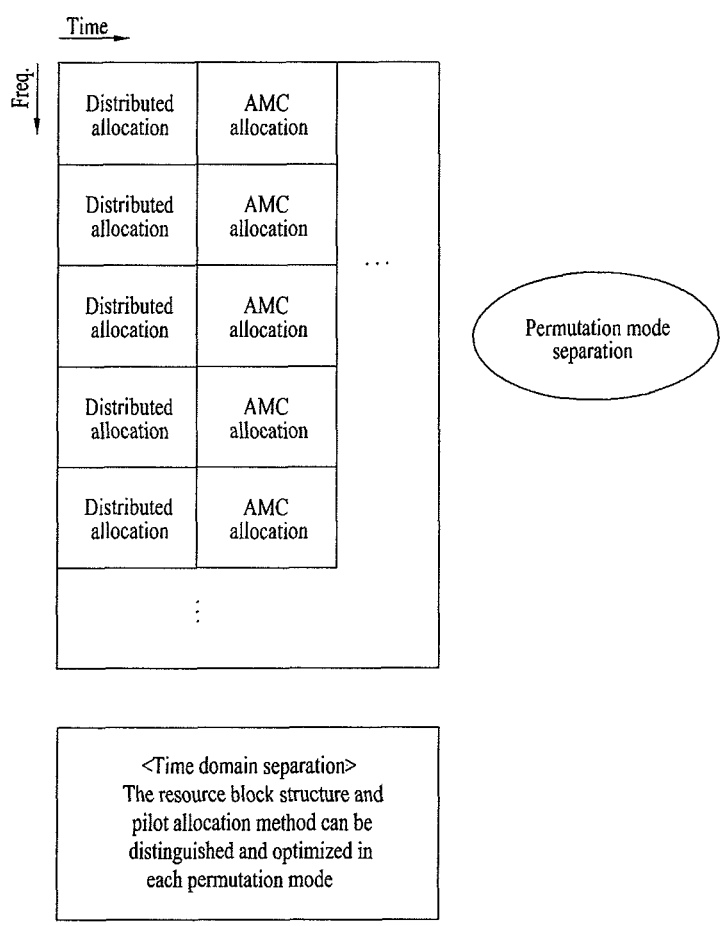
FIG. 2 shows an exemplary related art data allocation structure.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

In this document, "Legacy MS" refers to a mobile station (MS) compliant with the WirelessMAN-OFDMA Reference System, "Legacy BS" refers to a BS compliant with the WirelessMAN-OFDMA Reference System, "IEEE 802.16m MS"

refers to a MS compliant with the IEEE 802.16 Wireless-MAN-OFDMA specification specified by IEEE 802.16-2004 and amended by IEEE 802.16e-2005 and IEEE 802.16m, and "IEEE 802.16m BS" refers to a BS compliant with the IEEE 802.16 WirelessMAN-OFDMA specification specified by IEEE 802.16-2004 and amended by IEEE 802.16e-2005 and IEEE 802.16m. The entire contents of each of these documents is incorporated herein by reference.

IEEE 802.16m may provide continuing support and interoperability for legacy WirelessMAN-OFDMA equipment, including MSs (Mobile Station) and BSs (Base Station). Specifically, the features, functions and protocols enabled in IEEE 802.16m may support the features, functions and protocols employed by WirelessMAN-OFDMA legacy equipment. IEEE 802.16m may provide the ability to disable legacy support.

The backward compatibility may satisfy following requirements:
- An IEEE 802.16m MS shall be able to operate with a legacy BS, at a level of performance equivalent to that of a legacy MS.
- Systems based on IEEE 802.16m and the WirelessMAN-OFDMA Reference System shall be able to operate on the same RF (Radio Frequency) carrier, with the same channel bandwidth; and should be able to operate on the same RF carrier with different channel bandwidths.
- An IEEE 802.16m BS shall support a mix of IEEE 802.16m and legacy MSs when both are operating on the same RF carrier. The system performance with such a mix should improve with the fraction of IEEE 802.16m MSs attached to the BS.
- An IEEE 802.16m BS shall support handover of a legacy MS to and from a legacy BS and to and from IEEE 802.16m BS, at a level of performance equivalent to handover between two legacy BSs.
- An IEEE 802.16m BS shall be able to support a legacy MS while also supporting IEEE 802.16m MSs on the same RF carrier, at a level of performance equivalent to that a legacy BS provides to a legacy MS.

To support backward compatibility, multiplexing of 16e and 16m is required. Such a multiplexing can be performed by two multiplexing schemes, that is, TDM and/or FDM. TDM is beneficial in that full flexibility for 16m system optimization is supported. However, TDM may have the defect of link budget loss of legacy. On the other hand, FDM is beneficial in that no impact in terms of link budget occurs on legacy system. However, FDM may have the defect that 16m sub-channelization is restricted due to co-existence of 16e PUSC in the same sub-frame. Specifically, TDM scheme may have technical problem of implementation when AMC mode is used in 16e legacy system. On the other hand, FDM scheme may have technical problem of implementation when PUSC mode is used in 16e legacy system.

Figure 3:
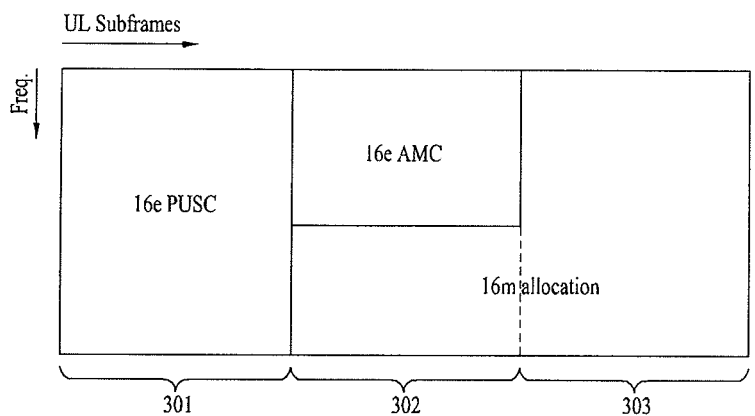
FIG. 3 to FIG. 5 shows an exemplary logical multiplexing structure according to one embodiment of the present invention.

FIG. 3 shows an exemplary logical multiplexing structure according to one embodiment of the present invention.

Referring to FIG. 3, the zone 301, 302, and 303 consists of one (1) sub-frame, respectively. Zone 303 is reserved only for '16m allocation for all types', '16e PUSC' is multiplexed with '16m allocation for all types' or separated from '16e AMC' in TDM manner, and '16e AMC' is multiplexed with '16m allocation for all types' in TDM and/or FDM manner. Further, '16e AMC' and '16m allocation for all types' are multiplexed in zone 302 in FDM manner. However, according to the multiplexing structure of FIG. 3, there might be a legacy coverage loss because the time span of zone 301 for 16e system is limited by TDM scheme.

Figure 4:
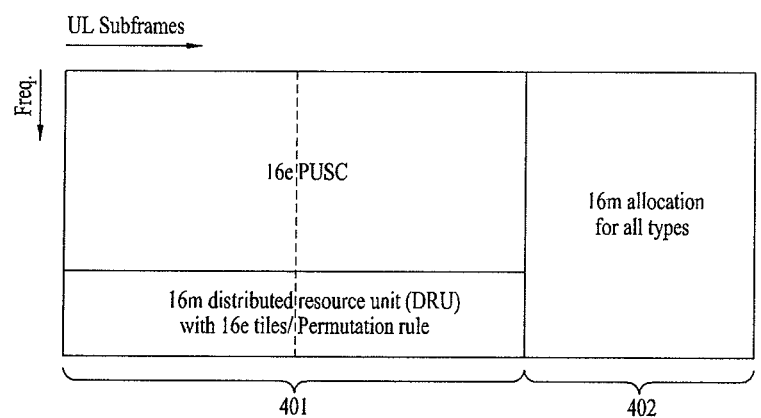

FIG. 4 shows an exemplary logical multiplexing structure according to another embodiment of the present invention.

Referring to FIG. 4, zone 401 for '16e PUSC' and "16m distributed resource unit (DRU) with 16e tiles/permutation rule" consists of two (2) sub-frames. Zone 402 is reserved only for '16m allocation for all types', and consists of one (1) sub-frame. The '16e PUSC' and the "16m distributed resource unit (DRU) with 16e tiles/permutation rule" are multiplexed in zone 401 in FDM manner.

Figure 5:
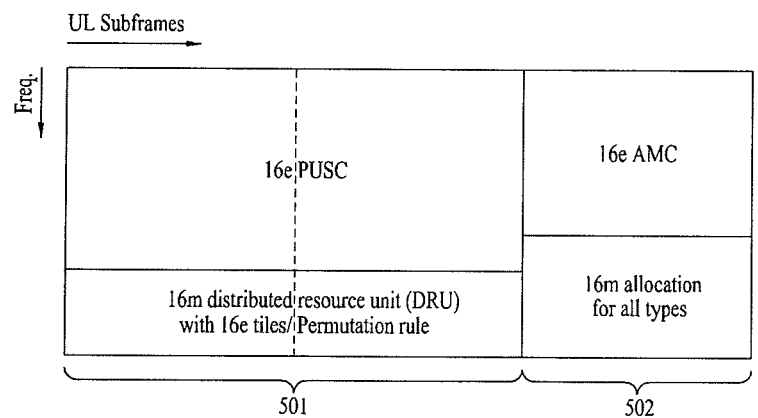

FIG. 5 shows an exemplary logical multiplexing structure according to another embodiment of the present invention.

Referring to FIG. 5, zone 502 is reserved for '16m allocation for all types' and '16e AMC', and consists of one (1) sub-frame. Zone 501 is reserved for '16e PUSC' and "16m distributed resource unit (DRU) with 16e tiles/permutation rule," and consists of two (2) sub-frames.

Referring back to FIG. 4, it is shown that there exists '16m' only zone 402. With the multiplexing structure of FIG. 4 or FIG. 5, legacy coverage can be extended because the time span of the '16e PUSC' zone 401 or 501 is rather longer than that of the multiplexing structure of FIG. 3. However, according to the structure of FIG. 4 and FIG. 5, 16m system complexity may increase due to two distributed permutation rules. In these structures, if UL has three (3) sub-frames, the size of the '16e PUSC' zone 401 and 501 may consist of two (2) sub-frames for supporting legacy coverage, and if UL has four (4) sub-frames, the size of the '16e PUSC' zone 401 and 501 may consist of three (3) sub-frames for supporting legacy coverage.

Figure 6:
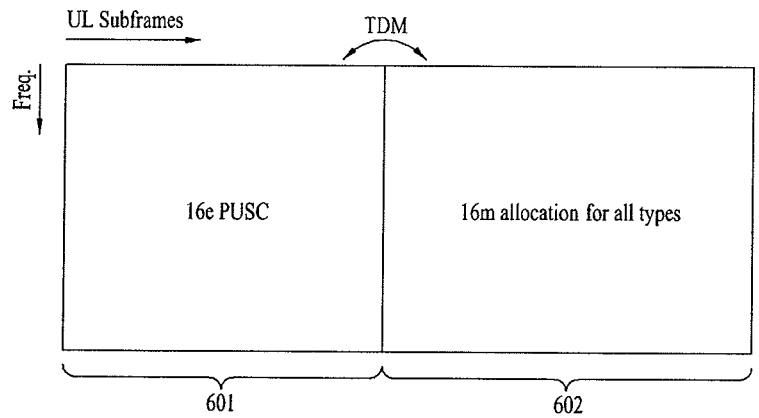
FIG. 6 shows an exemplary logical multiplexing structure according to another embodiment of the present invention when a legacy system operates only in PUSC mode for UL sub-frames.

FIG. 6 shows an exemplary logical multiplexing structure according to another embodiment of the present invention when a legacy system operates only in PUSC mode for UL sub-frames. In this multiplexing structure, '16e PUSC' and '16m allocation for all types' are multiplexed in TDM manner for legacy support. According to the multiplexing structure of FIG. 6, the effect of legacy 16e system on 16m resource allocation can be minimized because the frequency granularity of 16m resource allocation unit is not influenced by 16e legacy system. Further, in this case, if a UL PRU (Physical Resource Unit) consists of 18 sub-carriers by 6 OFDM symbols, the UK PRU can be easily applied to the multiplexed structure because it has commonality with DL PRU.

Figure 7:
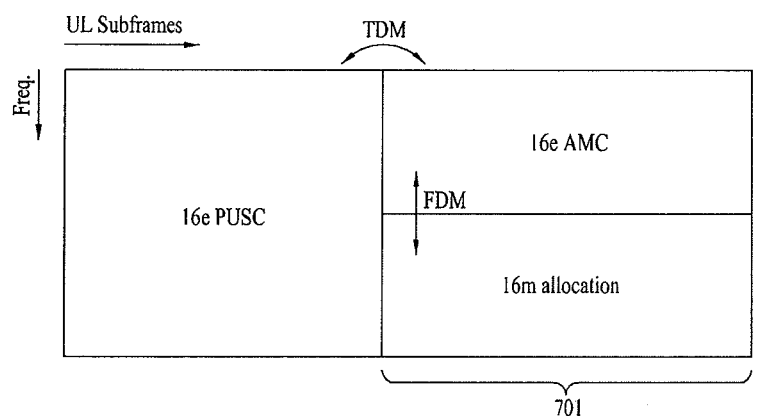
FIG. 7 shows an exemplary logical multiplexing structure according to another embodiment of the present invention when a legacy system operates in both PUSC and AMC mode for UL sub-frames.

FIG. 7 shows an exemplary logical multiplexing structure according to another embodiment of the present invention when a legacy system operates in both PUSC and AMC mode for UL sub-frames. In this multiplexing structure, '16e PUSC' and '16m allocation for all types' are multiplexed in TDM manner, and '16e PUSC' and '16e AMC' are separated in TDM manner. On the other hand, '16e AMC' and '16m allocation for all types' are multiplexed in FDM manner in the same zone 701.

Figure 8:
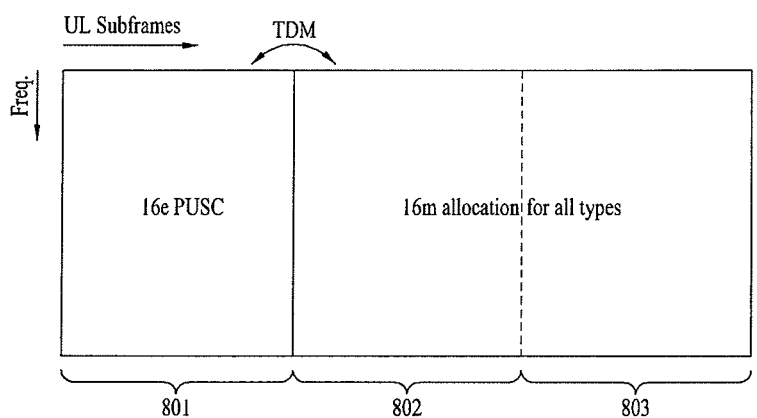
FIG. 8 shows an exemplary logical multiplexing structure according to another embodiment of the present invention when a legacy system operates only in PUSC mode for UL sub-frames.

FIG. 8 shows an exemplary logical multiplexing structure according to another embodiment of the present invention when a legacy system operates only in PUSC mode for UL sub-frames. In this multiplexing structure, '16m allocation for all types' and '16e PUSC' are always multiplexed in TDM manner, and a PRU of 18 sub-carriers by 6 OFDMA symbols can be used for 16m resource allocation without modification. Referring to FIG. 8, the multiplexing structure may consist of three (3) UL sub-frames 801, 802, and 803, and '16e PUSC' is allocated in one (1) sub-frame 801. It should be noted that the present invention is not limited by the specific time length of each zone 801, 802, or 803.

Figure 9:
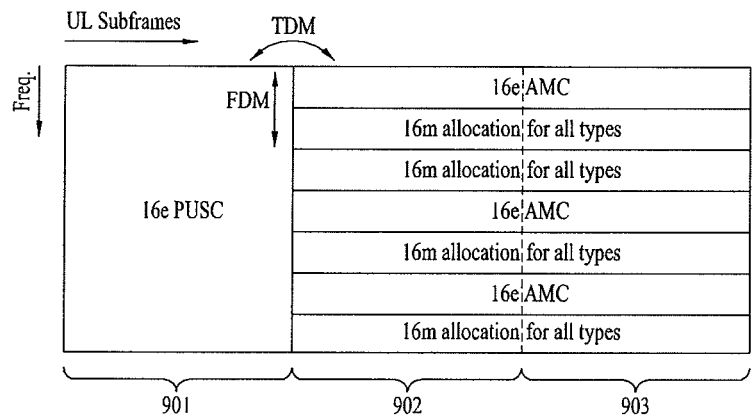
FIG. 9 shows an exemplary logical multiplexing structure according to another embodiment of the present invention when a legacy system operates both in PUSC and AMC mode for UL sub-frames.

FIG. 9 shows an exemplary logical multiplexing structure according to another embodiment of the present invention when a legacy system operates both in PUSC and AMC mode for UL sub-frames. In this multiplexing structure, '16m allocation for all types' and '16e PUSC' are always multiplexed in TDM manner, '16m allocation for all types' and '16e AMC' are always multiplexed in FDM manner, and a PRU of 18 sub-carriers by 6 OFDMA symbols can be used for 16m resource allocation without modification. Referring to FIG. 9, the multiplexing structure may consist of three (3) UL sub-frames 901, 902, and 903, and '16e PUSC' is allocated in one (1) sub-frame 901; however, it is apparent that the present invention is not limited by the exemplary structure of FIG. 9.

Figure 10:
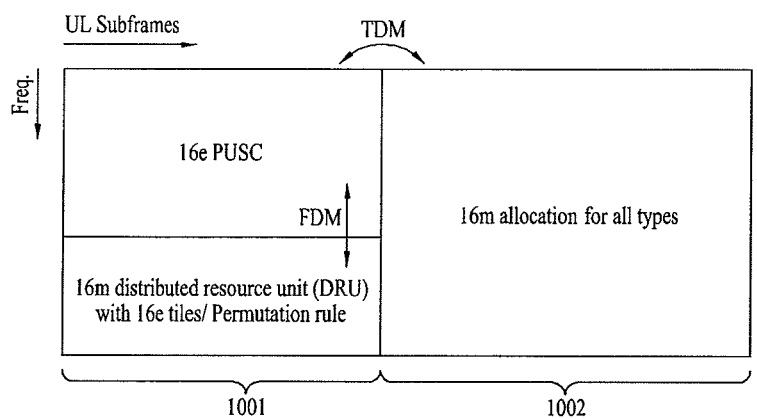
FIG. 10 shows an exemplary logical multiplexing structure according to another embodiment of the present invention when a legacy system operates only in PUSC mode for UL sub-frames.

FIG. 10 shows an exemplary logical multiplexing structure according to another embodiment of the present invention when a legacy system operates only in PUSC mode for UL sub-frames. In this multiplexing structure, '16m' and '16e PUSC' are multiplexed both in TDM and FDM manner. In zone 1001, the '16m' can be multiplexed with the '16e PUSC' in FDM manner if '16m' supports the same tiles/permutation rule as the 16e tiles/permutation rules or supports granularity which is compatible with the granularity of '16e PUSC', when part of zone 1001 remains empty after '16e PUSC' allocation. However, '16m allocation for all types' can be multiplexed with '16e PUSC' in TDM manner in zone 1002.

Figure 11:
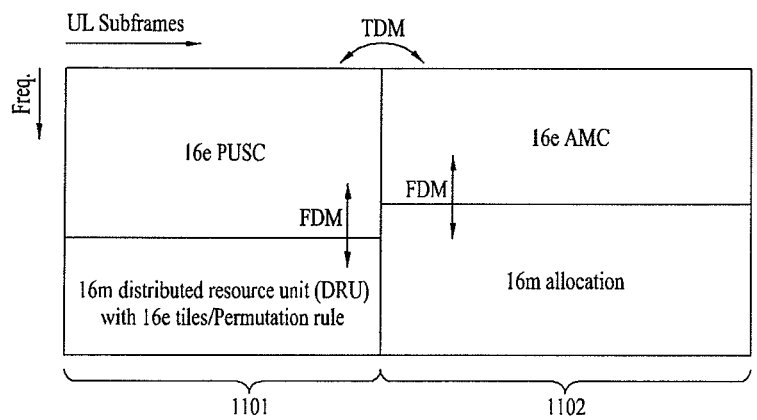
FIG. 11 shows an exemplary logical multiplexing structure according to another embodiment of the present invention when a legacy system operates both in PUSC and AMC mode for UL sub-frames.

FIG. 11 shows an exemplary logical multiplexing structure according to another embodiment of the present invention when a legacy system operates both in PUSC and AMC mode for UL sub-frames. In this multiplexing structure, '16m' and '16e PUSC' are multiplexed both in TDM and FDM manner, and '16m allocation for all types' and '16e AMC' are multiplexed in FDM manner. In zone 1101, the '16m' can be multiplexed with the '16e PUSC' in FDM manner if '16m' supports the same tiles/permutation rule as the 16e tiles/permutation rules or supports granularity which is compatible with the granularity of '16e PUSC', when part of zone 1101 remains empty after '16e PUSC' allocation. However, '16m allocation for all types' can be multiplexed with the '16e AMC' in FDM manner in zone 1102. Meanwhile, '16m' in zone 1102 can be multiplexed with '16e PUSC' in TDM manner. The multiplexing structure of FIG. 11 is beneficially applicable in an environment where a number of allocation modes such as '16e AMC', '16e PUSC', '16m distributed resource unit (DRU) mode', and '16m localized mode' should be allocated in a single time zone.

Figure 12:
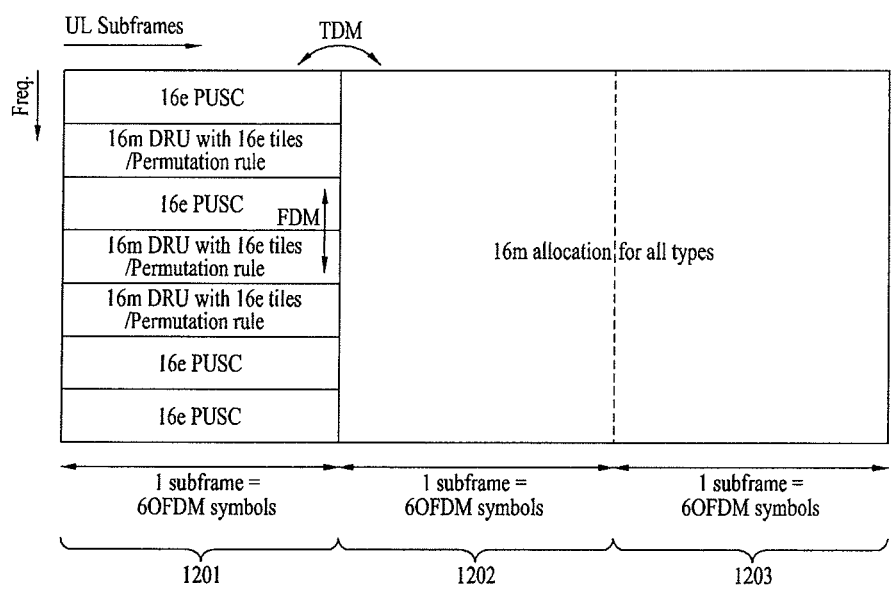
FIG. 12 and FIG. 13A respectively show an exemplary physical multiplexing structure of the logical multiplexing structure of FIG. 10 and FIG. 11, respectively.
Figure 13A:
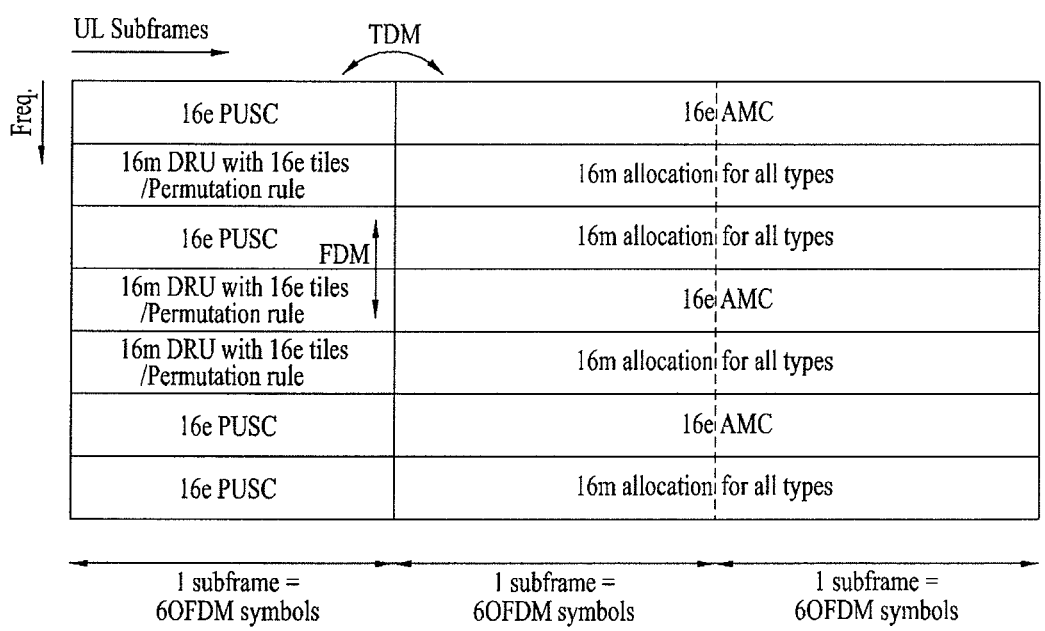

FIG. 12 and FIG. 13A respectively show an exemplary physical multiplexing structure of the logical multiplexing structure of FIG. 10 and FIG. 11, respectively.

In the physical domain shown in FIGS. 12-13A, the 16e region and the 16m (with diversity) region of FIGS. 10-11, respectively, may be interlaced by a predetermined rule (e.g., the 16e PUSC permutation rule). Frequency granularity of the 16e region PUSC mode may be based on the use of 4×3 tiles. In one example, by adding two 4×3 tiles to create a composite 4×6 tile for the 16e mode, and by restricting the 16m mode to have tiles of size 4×6, a common tile structure (i.e., 4×6) is used in both the 16e and 16m (with diversity) regions. These commonly sized tiles structures may be interlaced in the frequency domain in any predetermined order (e.g., 16e followed by one or more 16m followed by one or more 16e). Interlacing of these specifically sized tiles allows for efficient frequency use. These specifically sized tiles may also be time division multiplexed with differently sized tiles (i.e., integer multiples of 4×6), such as tiles for '16e AMC' and/or '16m allocation for all types.'

Figure 13B:
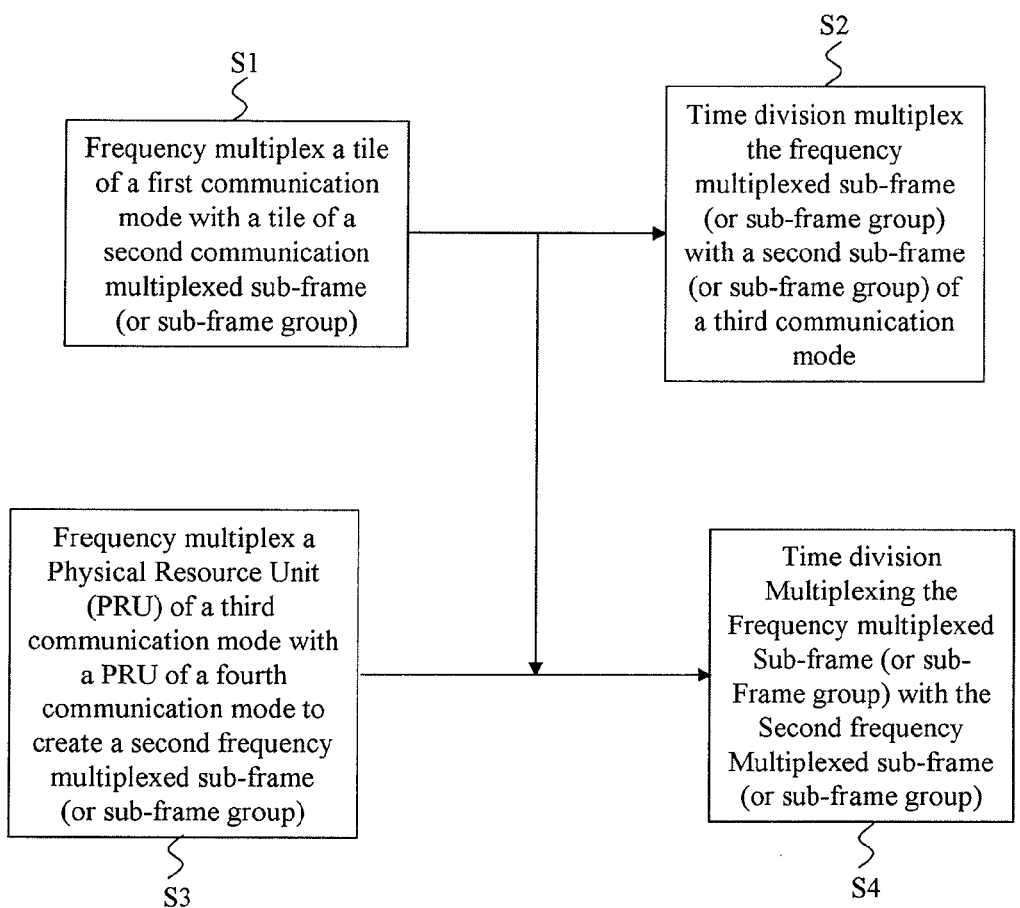
FIGS. 13B and 13C show methods for multiplexing and demultiplexing the frames shown in FIG. 13A.

FIG. 13B shows a pre-transmission method for creating the structures shown in FIGS. 11 and 13A. Once data is ready to transmit, a device frequency multiplexes a tile of a first communication mode with a tile of a second communication mode to create a frequency multiplexed sub-frame (S1) to create the subframes 1101 of FIG. 11. The tile of the first communication mode may include $X_1$ contiguous subcarriers and $Y_1$ contiguous OFDMA symbols. The tile of the second communication mode may include $X_2$ contiguous subcarriers and $Y_2$ contiguous OFDMA symbols. The multiple may be an integer multiple (e.g., 2, such that X1=X2=4, Y1=3, and Y2=6). The first communication mode may include PUSC (Partial Usage of Sub-Channels) sub-channelization. The second communication mode may include tile permutation.

Optionally, the device time division multiplexes the frequency multiplexed sub-frame with a second sub-frame of a third communication mode (e.g., one of the subframes 1102 of FIG. 11) (S2). The third communication mode may include adjacent sub-carrier permutation (AMC) or may include distributed sub-carrier permutation.

In another option, the device frequency multiplexes a Physical Resource Unit (PRU) of a third communication mode with a PRU of a fourth communication mode to create a second frequency multiplexed sub-frame (e.g., to create one of the subframes 1102 of FIG. 11) (S3). Optionally, the device then time division multiplexing the frequency multiplexed sub-frame with the second frequency multiplexed sub-frame (S4). The PRU of the third communication mode may include $X_3$ contiguous subcarriers and $Y_3$ contiguous OFDMA symbols. The PRU of the fourth communication mode comprises $X_4$ contiguous subcarriers and $Y_4$ contiguous OFDMA symbols. In one option, X3=X4 and Y4 is a multiple of Y3 (e.g., x3=18, y3=3, and y4=6). The third communication mode may include adjacent sub-carrier permutation (AMC), and the fourth communication mode may include distributed sub-carrier permutation.

Figure 13C:
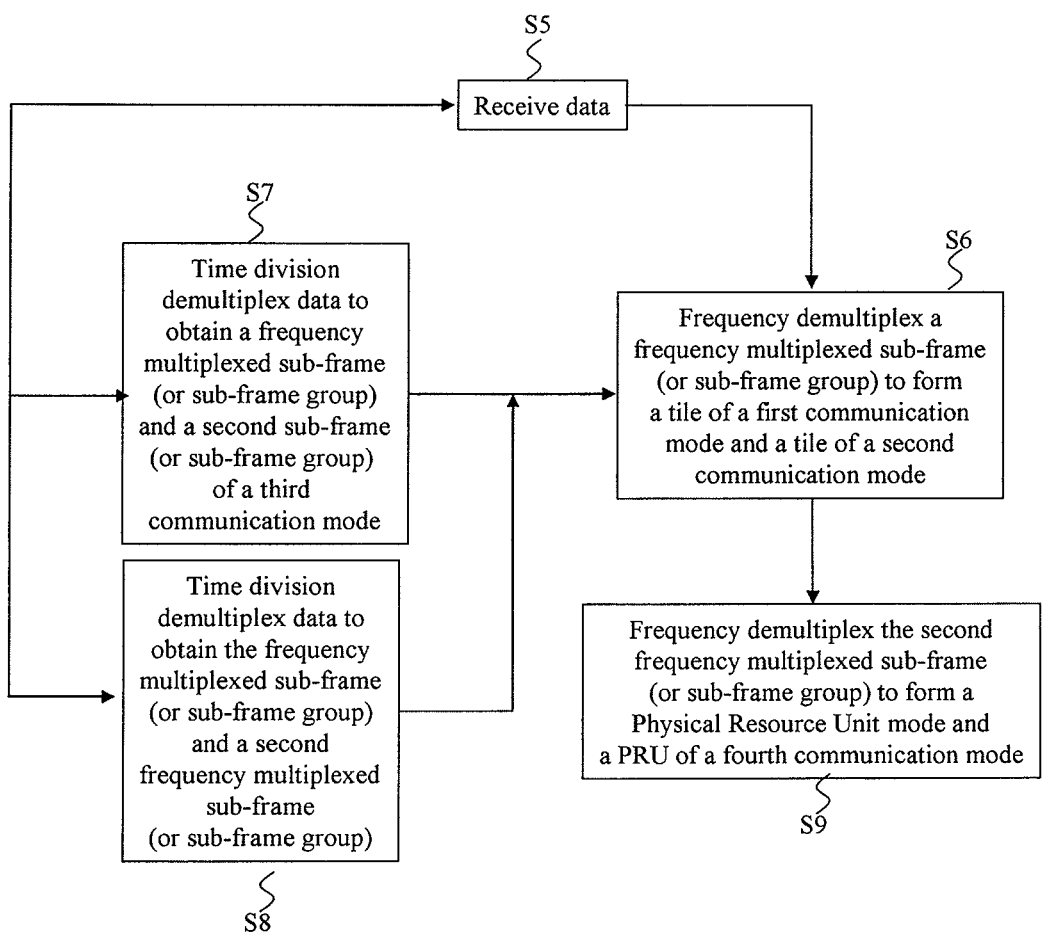

The method of FIG. 13C is the inverse of FIG. 13B. FIG. 13C shows a post reception method for creating the structures shown in FIGS. 11 and 13A. Once data is received (S5), a device frequency demultiplexes a frequency multiplexed sub-frame to form a tile of a first communication mode and a tile of a second communication mode (S6). Optionally, the device time division demultiplexes received data to obtain the frequency multiplexed sub-frame and a second sub-frame of a third communication mode (S7). Alternatively, the device time division demultiplexes data to obtain the frequency multiplexed sub-frame and a second frequency multiplexed sub-frame (S8). With this alternative, the device may also frequency demultiplex the second frequency multiplexed sub-frame to form a Physical Resource Unit (PRU) of a third communication mode and a PRU of a fourth communication mode (S9) in addition to frequency demultiplexing the frequency multiplexed sub-frame to form a tile of a first communication mode and a tile of a second communication mode (S6).

Figure 14:
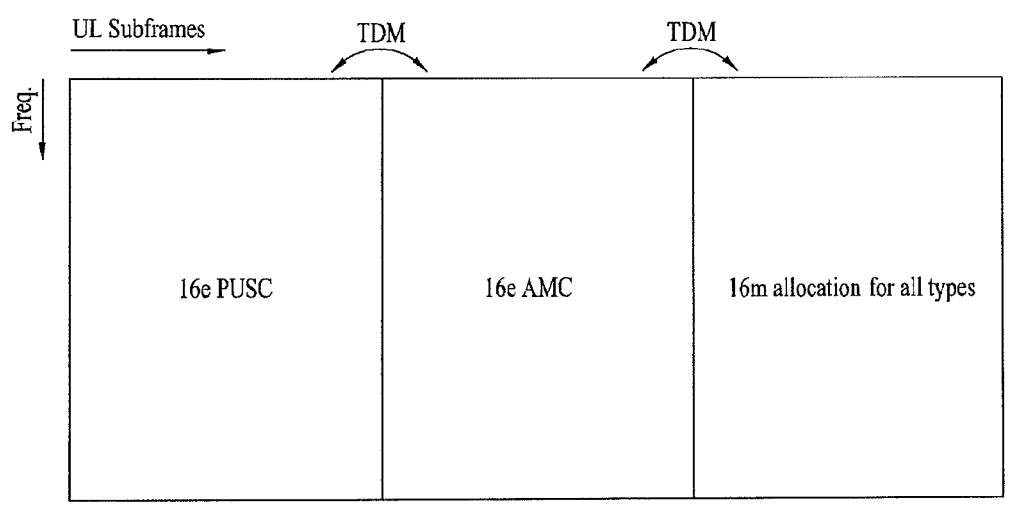
FIG. 14 shows an exemplary logical multiplexing structure according to another embodiment of the present invention when a legacy system operates both in PUSC and AMC mode for UL sub-frames.

FIG. 14 shows an exemplary logical multiplexing structure according to another embodiment of the present invention when a legacy system operates both in PUSC and AMC mode for UL sub-frames. In this multiplexing structure, '16e PUSC' is separated from '16e AMC' in TDM manner as in conventional methods, and '16m' is multiplexed with '16e PUSC' and '16e AMC' in TDM manner. According to the multiplexing structure of FIG. 14, the effect of legacy 16e system on 16m resource allocation can be minimized because the frequency granularity of 16m resource allocation is not influenced by the 16e legacy system. Further, in this case, if a UL PRU (Physical Resource Unit) consists of 18 sub-carriers by 6 OFDM symbols, the UK PRU can be easily applied to the multiplexed structure because it has commonality with DL PRU.

Figure 15:
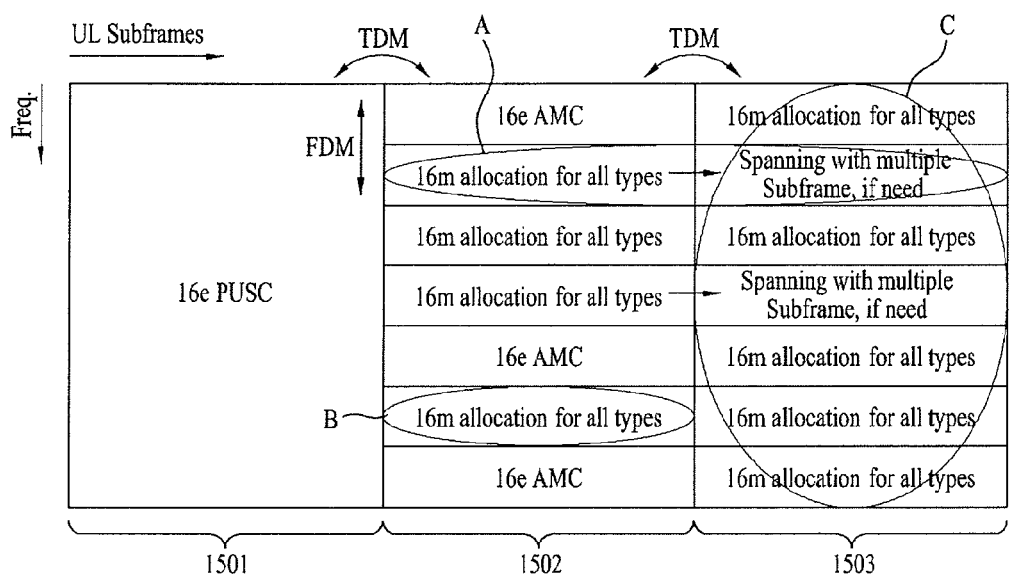
FIG. 15 shows an exemplary multiplexing structure according to another embodiment of the present invention when a legacy system operates both in PUSC and AMC mode for UL sub-frames.

FIG. 15 shows an exemplary multiplexing structure according to another embodiment of the present invention when a legacy system operates both in PUSC and AMC mode for UL sub-frames. Referring to FIG. 15, it is shown that zone 1503 is reserved only for '16m allocation for all types', and may consists of one or more sub-frames. In zone 1503, '16m' can be multiplexed in TDM manner both with '16e PUSC' and '16e AMC'. In this multiplexing structure, '16e PUSC' is multiplexed with '16m allocation for all types' in TDM manner, and '16e AMC' may be multiplexed with '16m allocation for all types' in TDM and/or FDM manner.

According to the multiplexing structure of FIG. 15, the effect of legacy 16e system on 16m resource allocation can be minimized because the frequency granularity of 16m resource allocation is not influenced by the 16e legacy system. Further, the effect of legacy 16e system on 16m resource allocation can be minimized if the size of the PRU used in zone 1502 is 18 sub-carriers by 6 OFDM symbols, because the frequency granularity of '16m allocation for all types' is the same as that of '16e AMC'.

If one or more UL sub-frames are not allocated for '16e PUSC' and '16e AMC', '16m allocation for all types' can be multiplexed with '16e AMC' in TDM manner.

In this case, the '16m allocation for all types' in zone 1502 may not have sufficient band-scheduling gain or frequency diversity gain because '16m localized' and '16m distributed' in zone 1502 are multiplexed in FDM manner with '16e AMC'. Therefore, it is advantageous for '16m allocation for all types' to be multiplexed in TDM manner with '16e AMD' in zone 1503. However, multiplexing '16m' in TDM manner with '16e AMD' may cause UL coverage problem because the time span for '16m' in zone 1503 may not be sufficient. To solve this problem, the sub-frame of zone 1502 may span or concatenated to the adjacent sub-frame(s) of zone 1503 for 16m allocation. Referring to FIG. 15, the 16m resources multiplexed in FDM manner with '16e AMC' may span to adjacent next sub-frame(s) (A) or not (B), and the 16m resources multiplexed in TDM manner with '16e AMC' may span to adjacent precedent sub-frame(s) or not (C). Spanning the 16m resources to adjacent sub-frame(s) is advantageous for cell edge users because it may provide more UL coverage.

According to the multiplexing structure of FIG. 15, '16m allocation for all types' can be multiplexed both in FDM and TDM manner with '16e AMC'. In other words, hybrid FDM/TDM is supported between 16e AMD and 16m. As a result, a base station can get flexibility for trade-off between UL coverage and band-scheduling/diversity gain. In other words, a base station can get the flexibility because a zone 1503 which is reserved only for '16m allocation for all types' is provided when legacy system operates both in PUSC and AMC mode.

Figure 16:
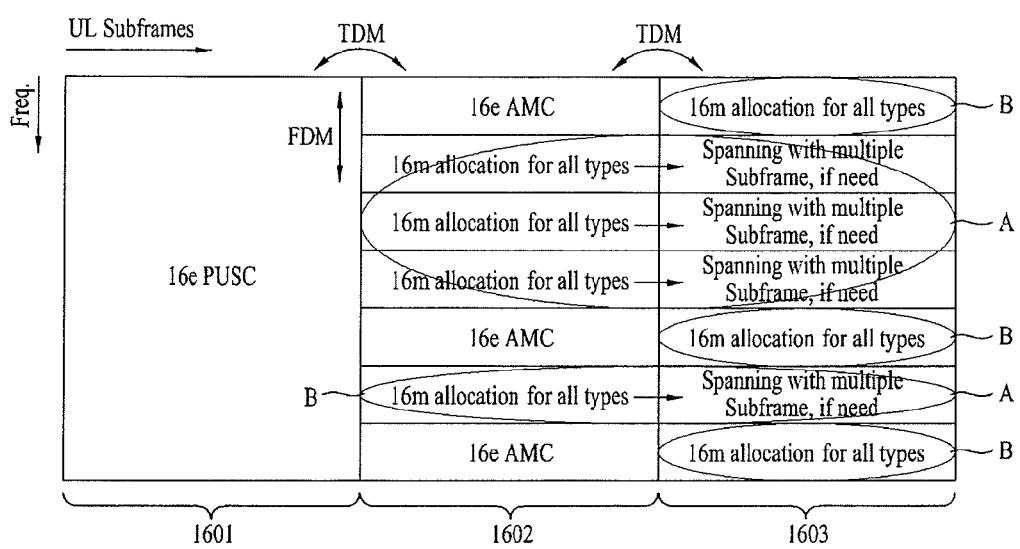
FIG. 16 shows an exemplary multiplexing structure according to another embodiment of the present invention when a legacy system operates both in PUSC and AMC mode for UL sub-frames.

FIG. 16 shows an exemplary multiplexing structure according to another embodiment of the present invention when a legacy system operates both in PUSC and AMC mode for UL sub-frames.

The multiplexing structure of FIG. 16 can be regarded as modified from the multiplexing structure of FIG. 15. According to FIG. 16, all of the resources for '16m allocation for all types' in zone 1602, which is multiplexed in FDM manner with '16e AMC', spans to the adjacent next sub-frame(s) (A). These spanning resources may be allocated only for those MSs which are located at cell edge or for those MSs which have more concern in power optimization than in band-scheduling gain or diversity gain. On the other hand, the resources for '16m allocation for all types' in zone 1603 (B), which is a complementary of those spanning resources discussed above, and which is multiplexed in TDM manner with '16e AMC', may be allocated only for those MSs which have less concern in power optimization or for those MSs which are not located in cell edge.

Figure 17:
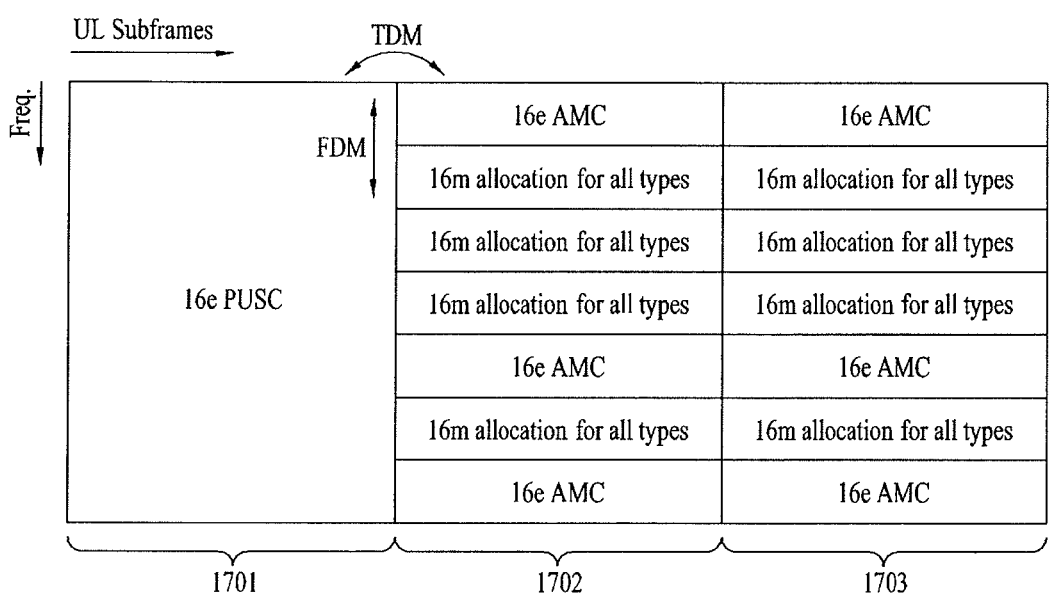
FIG. 17 shows an exemplary multiplexing structure according to another embodiment of the present invention when a legacy system operates both in PUSC and AMC mode for UL sub-frames.

FIG. 17 shows an exemplary multiplexing structure according to another embodiment of the present invention when a legacy system operates both in PUSC and AMC mode for UL sub-frames. Referring to FIG. 17, it is shown that at least part of each sub-frame 1701, 1702, 1703 is allocated for either '16e PUSC' or '16e AMC'. In this multiplexing structure, '16e PUSC' is multiplexed with '16m allocation for all types' in TDM manner, '16e PUSC' is separated with '16e AMD' in TDM manner, and '16e AMC' may be multiplexed with '16m allocation for all types' only in FDM manner. Therefore, every resource for 16m in zone 1702 has a chance to span to adjacent next sub-frame(s) in zone 1703 for UL coverage increase.

According to the multiplexing structure of FIG. 17, the effect of legacy 16e system on 16m resource allocation can be minimized because the frequency granularity of 16m resource allocation is not influenced by '16e PUSC'. Further, the effect of legacy 16e system on 16m resource allocation can be minimized if a PRU of 18 sub-carriers by 6 OFDM symbols is used for '16m' because then frequency granularity of '16m' is the same as that of '16e AMC'.

According to the present invention, information regarding the zone configuration of 16e can be signaled to IEEE 802.16m MS. For an example, it can be signaled in which mode among PUSC and AMC the 16e system operates at each sub-frame. For another example, when '16m' is multiplexed in FDM manner at a sub-frame where '16e' operates in AMC mode, information regarding resource allocation of '16e AMC' can be signaled to IEEE 802.16m MS. For still another example, when '16m' is multiplexed in FDM manner at a sub-frame where '16e' operates in PUSC mode, information regarding resource allocation of '16e PUSC' can be signaled to IEEE 802.16m MS if '16m' supports the same tiles/permutation rule as the 16e tiles/permutation rules or supports granularity which is compatible with the granularity of '16e PUSC'.

According to the present invention, each zone for '16e PUSC', '16e AMC', and '16m' of the multiplexing structure discussed in above embodiments may have a time length of one (1) sub-frame or a multiple of one (1) sub-frame. Also, the zone separation can be dependent on the number of available UL sub-frames.

In the above embodiments of the present invention, it was discussed that it is preferred that '16m' support the same tiles/permutation rule as the tiles/permutation rule of 16e legacy system or support granularity which is compatible with the granularity of '16e PUSC' and/or '16e AMC' so as to minimize the influence of legacy system on 16m system. According to the present invention, PRUs for 16m which are compatible with that of the legacy system in terms of granularity is provided. The structure of PRUs according to the present invention will be discussed hereinafter.

The resource dimension of a DL PRU of conventional system is defined by 18 sub-carriers by 6 OFDM symbols. To provide commonality with this DL PRU, the resource dimension of a UL PRU may preferably be defined by 18 sub-carriers by 6 OFDM symbols as the same as in the DL PRU. The advantage of adopting the PRU of 18 sub-carriers by 6 OFDM symbols has been discussed and proven enough in connection with DL PHY structure in the related industry.

Figure 18:
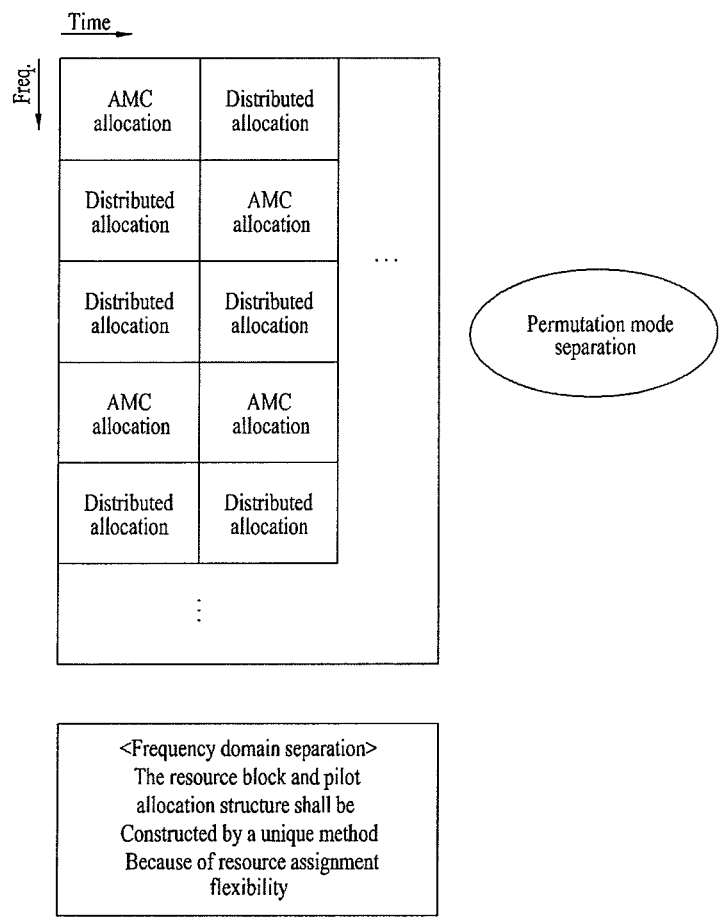
FIG. 18 shows an exemplary data allocation structure related to a unified basic data allocation structure and/or pilot transmission structure.

FIG. 18 shows an exemplary UL PHY structure which requires a unified basic data allocation structure and/or pilot transmission structure. Permutation rules are separated in frequency axis in this figure.

Hereinafter, the basic data allocation structure may be referred to as PRU (Physical Resource Unit). A PRU serves as the minimum structure for data allocation, and serves as a basic data transmission unit when performing sub-channelization and data/control information allocation of a scheduling for data transmission. That is, scheduling for localized permutation may take places in units of a multiple of a PRU and a basic data transmission unit is designed in units of a PRU, while each of a sub-carrier, a MRU (mini-PRU), and a PRU can serve as a basic unit for distributed permutation. For example, in LTE system, the PRU corresponds to a 'RB' (Resource Block), and, in conventional 802.16e system, the PRU corresponds to a 'slot'. It is necessary to determine granularity of a PRU in frequency and time domain when designing PRU. When a frame is divided into more than one sub-frames, if the number of OFDM symbols constituting a sub-frame is the same as the number of OFDA symbols of a PRU (i.e., one-dimensional resource allocation), the PRU is determined according to the number of sub-carriers constituting the PRU in frequency domain. If the number of OFDM symbols constituting a sub-frame is not the same as the number of OFDM symbols of a PRU (i.e., two-dimensional resource allocation), the PRU is determined by the number of OFDM symbols in time domain and the number of sub-carriers in frequency domain.

Figure 19:
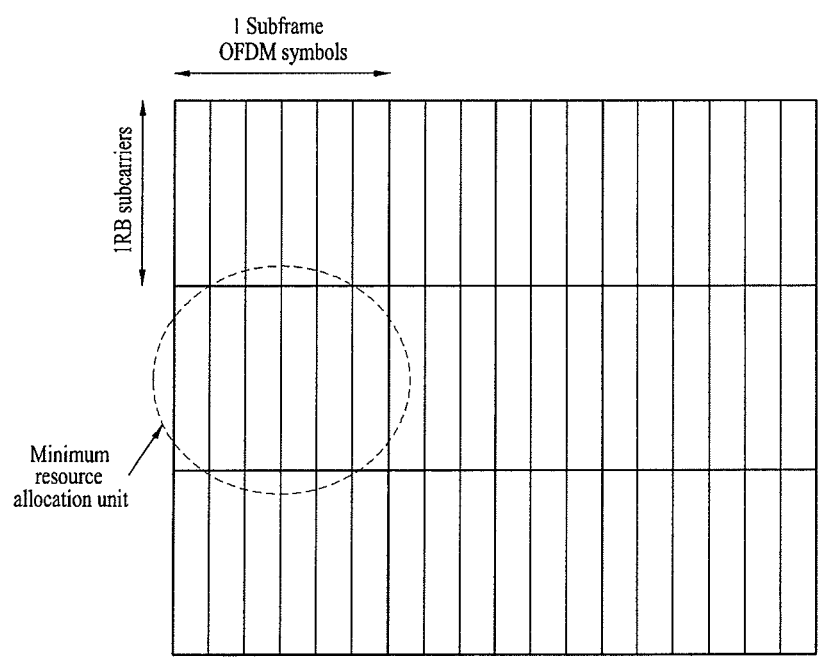
FIG. 19 shows an exemplary design of PRU for resource allocation.

FIG. 19 shows an exemplary design of a PRU for resource allocation.

If there exist more than one legacy support schemes applicable for uplink, that is, if both of TDM legacy support scheme and FDM legacy support scheme are taken into consideration, different PRUs are required according to each scheme, respectively. For example, when both conventional IEEE 802.16e legacy system and IEEE 802.16m new system are supported for UL frame at the same time, different PRUs are required according to the multiplexing schemes such as TDM and FDM by which resources are divided for the conventional and the new system. In addition, for PRU designing, it should be considered of a legacy disabled-mode where a UL frame does not support one of the different systems, for example, IEEE 802.16e legacy system, and only support the other system, for example IEEE 802.16m new system.

Possible multiplexing scenarios for legacy support are as follows: 1. TDM approached legacy support scenario 2. FDM approached legacy support (in AMD mode) scenario 3. Legacy disabled scenario 4. FDM approached legacy support (in PUSC mode) scenario. In the present invention, UL PRUs per each scenario are provided. In particular the structures can be used as a basic data allocation structure for uplink.

Figure 20:
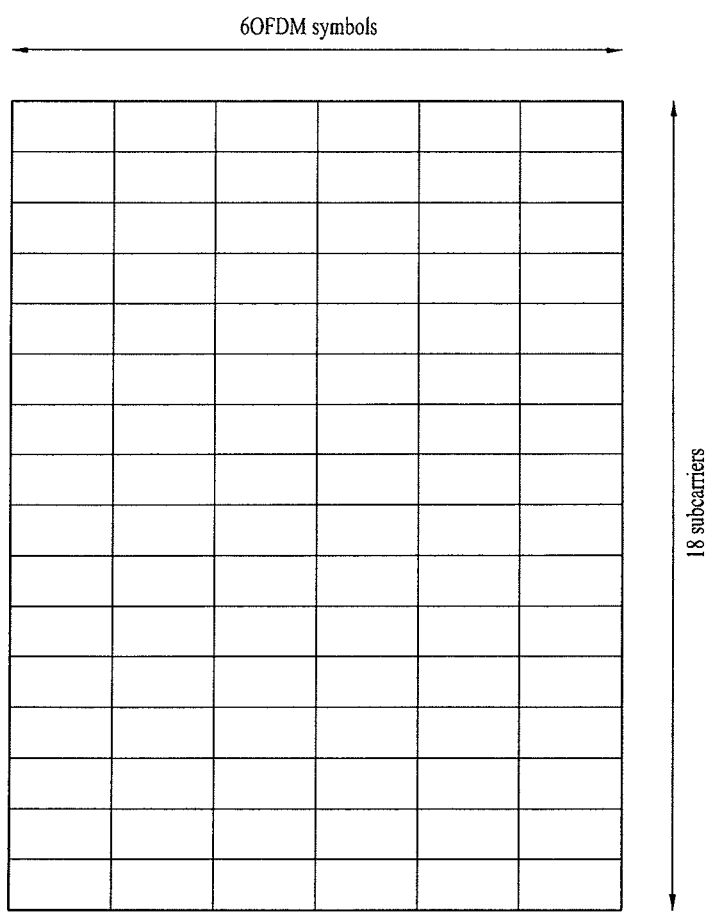
FIG. 20 shows a PRU according to an embodiment of the present invention.

FIG. 20 shows a PRU according to an embodiment of the present invention. Referring to FIG. 20, the PRU consists of 18 sub-carriers in frequency axis by 6 OFDM symbols in time axis.

According to the present invention, the PRU of FIG. 20 can be used for the TDM approached legacy support scenario. The PRU according to FIG. 20 is a basic structure of a minimum unit for data allocation, and serves as a basic data transmission unit when performing resource block channelization and data/control information allocation for scheduling of data transmission. Scheduling may take places in units of a multiple of a PRU or in units of a PRU according to the present invention. According to the present invention, the total of 108 tones exists in a PRU, part of which may be allocated as data sub-carrier, pilot sub-carrier, or as control signal region. When a new system adopts the basic numerology of conventional IEEE 802.16e system such that sub-carrier spacing becomes 10.9375 kHz, the total number of sub-carriers as many as 18 sub-carriers can have the size of 200 kHz adequate to band-scheduling, and the number '18' also can have many divisors. Therefore, designing a PRU to have a total of 18 sub-carriers is beneficial for distributed sub-channelization. In addition, designing a PRU to have a total of 6 OFDM symbols is beneficial for one-dimensional resource allocation if a transmission frame of a new system (e.g., IEEE 802.16m) consists of a number of sub-frames each of which comprised of 6 OFDM symbols. Further, the PRU of 18 sub-carriers by 6 OFDM symbols is beneficial for providing commonality between uplink and downlink when DL PRU consists of 18 sub-carriers by 6 OFDM symbols.

According to the present invention, the PRU of FIG. 20 also can be used for the FDM approached legacy support (in AMD mode) scenario. The PRU according to FIG. 20 is a basic structure of a minimum unit for data allocation, and serves as a basic data transmission unit when performing resource block channelization and data/control information allocation for scheduling of data transmission. Scheduling (i.e., the scope within which control information is allocated) may take places in units of a multiple of a PRU or in units of a PRU according to the present invention. According to the present invention, the total of 108 tones exists in a PRU, part of which may be allocated as data sub-carrier, pilot sub-carrier, or as control signal region. Designing a PRU to have as many as 18 sub-carriers is beneficial for supporting conventional AMC-mode when a legacy system is supported with FDM, and is beneficial for distributed sub-channelization because the number '18' has many divisors. In addition, designing a PRU to have a total of 6 OFDM symbols is beneficial for one-dimensional resource allocation if a transmission frame of a new system (e.g., IEEE 802.16m) consists of a number of sub-frames comprised of 6 OFDM symbols. Further, the PRU of 18 sub-carriers by 6 OFDM symbols is beneficial for providing commonality between uplink and downlink when DL PRU consists of 18 sub-carriers by 6 OFDM symbols.

According to the present invention, the PRU of FIG. 20 also can be used for the legacy disabled scenario. The PRU according to FIG. 20 is a basic structure of a minimum unit for data allocation, and serves as a basic data transmission unit when performing resource block channelization and data/control information allocation for scheduling of data transmission. Scheduling may take places in units of a multiple of a PRU or in units of a PRU according to the present invention. According to the present invention, the total of 108 tones exists in a PRU, part of which may be allocated as data sub-carrier, pilot sub-carrier, or as control signal region. When a new system adopts the basic numerology of conventional IEEE 802.16e system such that sub-carrier spacing becomes 10.9375 kHz, the total number of sub-carriers as many as 18 sub-carriers can have the size of 200 kHz adequate to band-scheduling, and the number '18' also can have many divisors. Therefore, designing a PRU to have a total of 18 sub-carriers is beneficial for distributed sub-channelization. In addition, designing a PRU to have a total of 6 OFDM symbols is beneficial for one-dimensional resource allocation if a transmission frame of a new system (e.g., IEEE 802.16m) consists of a number of sub-frames each of which comprised of 6 OFDM symbols. Further, the PRU of 18 sub-carriers by 6 OFDM symbols is beneficial for providing commonality between uplink and downlink when DL PRU consists of 18 sub-carriers by 6 OFDM symbols.

Figure 21:
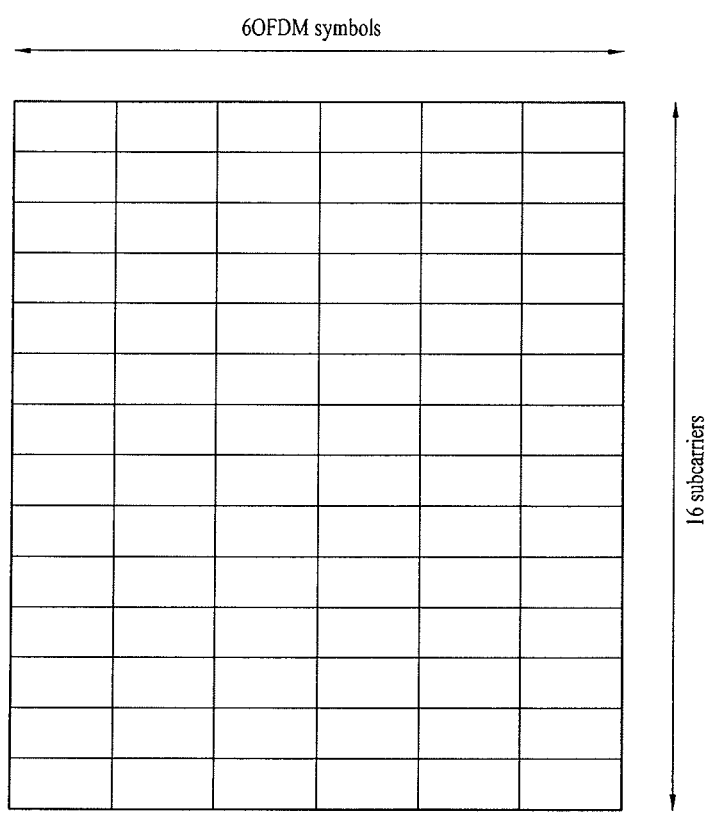
FIG. 21 shows a PRU according to another embodiment of the present invention.

FIG. 21 shows a PRU according to another embodiment of the present invention. Referring to FIG. 21, the PRU consists of 16 sub-carriers in frequency axis by 6 OFDM symbols in time axis.

According to the present invention, the PRU of FIG. 21 can be used for the FDM approached legacy support (in PUSC mode) scenario. The PRU according to FIG. 21 is a basic structure of a minimum unit for data allocation, and serves as a basic data transmission unit when performing resource block channelization and data/control information allocation for scheduling of data transmission. Scheduling may take places in units of a multiple of a PRU or in units of a PRU according to the present invention. According to the present invention, the total of 96 tones exists in a PRU, part of which may be allocated as data sub-carrier, pilot sub-carrier, or as control signal region. A new 16m system and the conventional 16e system can co-exist in a UL frame because sub-carriers as much as '16' sub-carriers in a PRU is a multiple of '4' sub-carriers, which is a basic size used for sub-channelization in the conventional system, such that the PRU of FIG. 21 can be easily adopted for numerology commonality of IEEE 802.16e legacy system.

Figure 22:
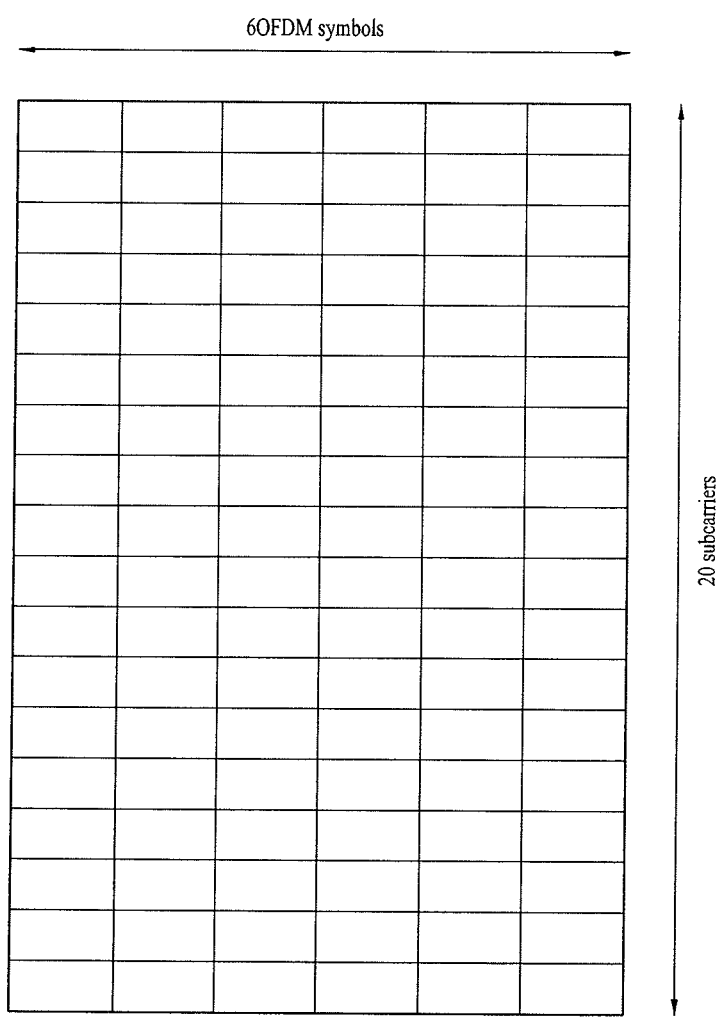
FIG. 22 shows a PRU according to another embodiment of the present invention.

FIG. 22 shows a PRU according to another embodiment of the present invention. Referring to FIG. 22, the PRU consists of 20 sub-carriers in frequency axis by 6 OFDM symbols in time axis.

According to the present invention, the PRU of FIG. 22 can be used for the FDM approached legacy support (in PUSC mode) scenario. The PRU according to FIG. 22 is a basic structure of a minimum unit for data allocation, and serves as a basic data transmission unit when performing resource block channelization and data/control information allocation for scheduling of data transmission. Scheduling may take places in units of a multiple of a PRU or in units of a PRU according to the present invention. According to the present invention, the total of 120 tones exists in a PRU, part of which may be allocated as data sub-carrier, pilot sub-carrier, or as control signal region. A new 16m system and the conventional 16e system can co-exist in a UL frame because sub-carriers as much as '20' sub-carriers in a PRU is a multiple of '4' sub-carriers, which is a basic size used for sub-channelization in the conventional system, such that the PRU of FIG. 22 can be easily adopted for numerology commonality of IEEE 802.16e legacy system.

According to another embodiment of the present invention, change of legacy support modes can be signaled so that different PRUs (size of 18*6, 16*6, 20*6 in the present invention) can be applied according to the changed legacy support mode in an environment where TDM/FDM legacy support modes are supported in the same UL frame, or TDM/FDM legacy support mode as well as legacy disabled mode are supported in the same multiple-frames or in the same superframe. This signaling can be transmitted via a control channel per frame (e.g., sub-map) or via a control channel per superframe (i.e., a bunch of sub-frames) (e.g., super-map). The signaling may be transmitted periodically, or may be transmitted on the basis of even-triggering when necessary.

Table 1 shows an example of an applicable sub-carrier configuration when the PRU of 18 sub-carriers by 6 OFDM symbols according to the present invention is used.

TABLE 1

|  | 2048 FFT size | 1024 FFT size | 512 FFT size |
| --- | --- | --- | --- |
| Number of used sub-carriers | 1729 (including DC) | 865 | 433 |
| Left/Right guard sub-carriers | 160/159 | 80/79 | 40/39 |
| Number of sub-carriers (Resource blocks) | 96 | 48 | 24 |

Table 2 shows an example of an applicable sub-carrier configuration when the PRU of 16 sub-carriers by 6 OFDM symbols according to the present invention is used.

TABLE 2

|  | 2048 FFT size | 1024 FFT size | 512 FFT size |
| --- | --- | --- | --- |
| Number of used sub-carriers | 1729 (including DC) | 865 | 433 |
| Left/Right guard sub-carriers | 160/159 | 80/79 | 40/39 |
| Number of sub-carriers (Resource blocks) | 108 | 54 | 27 |

According to the PRU of 18 sub-carriers by 6 OFDM symbols of FIG. 20, the optimum band scheduling performance can be achieved and overhead signaling for resource allocation is minimized because frequency sub-carrier size beneficial for band scheduling (i.e., 18 sub-carriers) is applied. According to the PRU of 18 or 20 sub-carriers by 6 OFDM symbols of FIG. 21 or FIG. 22, flexible sub-channelization is achievable when legacy system is supported by FDM.

For UL transmission frame/sub-frame, there are occasions that it is required to define a sub-frame (or a set of sub-frames) which is longer compared to DL transmission for various reasons. In this case, according to other embodiments of the present invention, the PRUs of FIG. 20 to FIG. 22 may be modified to have 12 OFDM symbols rather than 6 ORDM symbols. Then, the PRU modified from FIG. 20 consists of 18 sub-carriers by 12 OFDM symbols, and has the total of 216 tones, part of which may be allocated as data sub-carrier, pilot sub-carrier, or control channel sub-carrier. Similarly, the PRU modified from FIG. 21 consists of 16 sub-carriers by 12 OFDM symbols, and has the total of 192 tones, part of which may be allocated as data sub-carrier, pilot sub-carrier, or control channel sub-carrier, and the PRU modified from FIG. 22 consists of 20 sub-carriers by 12 OFDM symbols, and has the total of 240 tones, part of which may be allocated as data sub-carrier, pilot sub-carrier, or control channel sub-carrier.

According to another embodiment of the present invention, a UL PRU may consists of 36 sub-carriers by 6 OFDM symbols which is applicable even for the FDM approached legacy support (in PUSC mode) scenario. In the conventional UL 16e system, distributed sub-channelization was difficult to implement because distributed sub-channelization was applied by tying tiles each of which is comprised of 4 sub-carriers, and because '4' is not a divisor of '18'. Therefore, if a PRU consists of 36 sub-carriers by 6 OFDM symbols, distributed sub-channelization can be implemented for the conventional UL 16e system because '4' is a divisor of '36'. In this embodiment, the PRU of 36 sub-carriers by 6 OFDM symbols can be applied as a basic allocation unit, or as a pair of PRUs each of which consists of 18 sub-carriers by 6 OFDM symbols.

Figure 23:
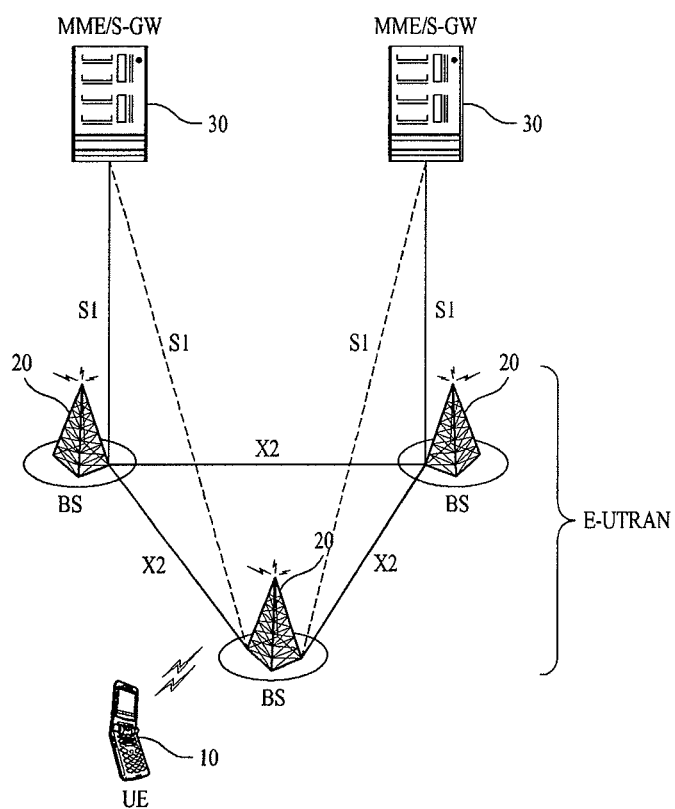
FIG. 23 shows a structure of a wireless communication system according to an embodiment of the invention.

FIG. 23 shows a structure of a wireless communication system capable of exchanging the data structures of FIGS. 3-17 and 20-22, including the method of FIGS. 13B-13C. The wireless communication system may have a network structure of an evolved-universal mobile telecommunications system (E-UMTS). The E-UMTS may also be referred to as a long term evolution (LTE) system. The wireless communication system can be widely deployed to provide a variety of communication services, such as voices, packet data, etc.

Referring to FIG. 23, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 24:
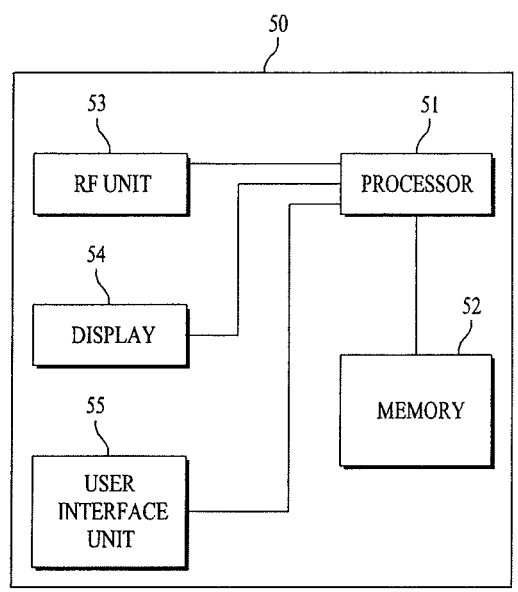
FIG. 24 is a block diagram showing constitutional elements of a user equipment according to an embodiment of the invention.

FIG. 24 is a block diagram showing constitutional elements of device 50, that can be either the UE or the BS of FIG. 13, and that is capable of exchanging the data structures of FIGS. 3-17 and 20-22, including the methods of FIGS. 13B-13C. A UE 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Also, one skilled in the art would recognize that, for each of the above described embodiments, multiple tiles distributed in the frequency domain may form one distributed resource unit (DRU).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention is applicable to those systems which support 16e legacy system.

What is claimed is:

1. A method of communicating by a mobile station in an Institute of Electrical and Electronics Engineers (IEEE) 802.16m system, the method comprising:
   receiving information via a control channel of a superframe from a base station, the information being related to an IEEE802.16e system; and
   transmitting signals using one or more tiles in a set of Orthogonal Frequency Division Multiple Access (OFDMA) symbols, the one or more tiles being related to the IEEE802.16e system or the IEEE802.16m system, when the information indicates that the IEEE802.16e system is supported,
   wherein, within the set of OFDMA symbols, one or more Partial Usage of Sub-Channels (PUSC) sub-channels of the IEEE802.16e system and one or more Distributed Resource Units (DRUs) of the IEEE802.16m system are frequency division multiplexed,
   wherein each PUSC sub-channel is based on a tile of $X_1$ contiguous subcarriers and $Y_1$ contiguous OFDMA symbols,
   wherein each DRU is based on a tile of $X_2$ contiguous subcarriers and $Y_2$ contiguous OFDMA symbols, the tile of $X_2$ contiguous subcarriers and $Y_2$ contiguous OFDMA symbols being obtained by an extension of the tile of $X_1$ contiguous subcarriers and $Y_1$ contiguous OFDMA symbols in a time domain,
   wherein $X_1=X_2=4$, $Y_1=3$, and $Y_2=6$, and
   wherein the set of OFDMA symbols consist of 6 OFDMA symbols.

2. The method of claim 1, wherein the one or more PUSC sub-channels of the IEEE802.16e system are obtained by PUSC sub-channelization.

3. The method of claim 1, wherein the one or more DRUs of the IEEE802.16m system are obtained by tile permutation.

4. A method of communicating by a base station in an Institute of Electrical and Electronics Engineers (IEEE) 802.16m system, the method comprising:
   transmitting information via a control channel of a superframe to plural mobile stations, the information being related to an IEEE802.16e system; and
   receiving signals via one or more tiles in a set of Orthogonal Frequency Division Multiple Access (OFDMA) symbols, the one or more tiles being related to the IEEE802.16e system or the IEEE802.16m system, when the information indicates that the IEEE802.16e system is supported,
   wherein, within the set of OFDMA symbols, one or more Partial Usage of Sub-Channels (PUSC) sub-channels of the IEEE802.16e system and one or more Distributed Resource Units (DRUs) of the IEEE802.16m system are frequency division multiplexed,
   wherein each PUSC sub-channel is based on a tile of $X_1$ contiguous subcarriers and $Y_1$ contiguous OFDMA symbols,
   wherein each DRU is based on a tile of $X_2$ contiguous subcarriers and $Y_2$ contiguous OFDMA symbols, the tile of $X_2$ contiguous subcarriers and $Y_2$ contiguous OFDMA symbols being obtained by an extension of the tile of $X_1$ contiguous subcarriers and $Y_1$ contiguous OFDMA symbols in a time domain,
   wherein $X_1=X_2=4$, $Y_1=3$, and $Y_2=6$, and
   wherein the set of OFDMA symbols consist of 6 OFDMA symbols.

5. The method of claim 4, wherein the one or more PUSC sub-channels of the IEEE802.16e system are obtained by PUSC sub-channelization.

6. The method of claim 4, wherein the one or more DRUs of the IEEE802.16m system are obtained by tile permutation.

7. A mobile station configured to wirelessly communicate with a base station in an Institute of Electrical and Electronics Engineers (IEEE) 802.16m system, the mobile station comprising:
   a RF unit; and a processor operatively connected to the RF unit and configured to receive information via a control channel of a super-frame from the base station, the information being related to an IEEE802.16e system, and to transmit signals using one or more tiles in a set of Orthogonal Frequency Division Multiple Access (OFDMA) symbols, the one or more tiles being related to the IEEE802.16e system or the IEEE802.16m system, when the information indicates that the IEEE802.16e system is supported, wherein, within the set of OFDMA symbols, one or more Partial Usage of Sub-Channels (PUSC) sub-channels of the IEEE802.16e system and one or more Distributed Resource Units (DRUs) of the IEEE802.16m system are frequency division multiplexed, wherein each PUSC sub-channel is based on a tile of $X_1$ contiguous subcarriers and $Y_1$ contiguous OFDMA symbols, wherein each DRU is based on a tile of $X_2$ contiguous subcarriers and $Y_2$ contiguous OFDMA symbols, the tile of $X_2$ contiguous subcarriers and $Y_2$ contiguous OFDMA symbols being obtained by an extension of the tile of $X_1$ contiguous subcarriers and $Y_1$ contiguous OFDMA symbols in a time domain, wherein $X_1=X_2=4$, $Y_1=3$, and $Y_2=6$, and wherein the set of OFDMA symbols consist of 6 OFDMA symbols.

8. The mobile station of claim 7, wherein the one or more PUSC sub-channels of the IEEE802.16e system are obtained by PUSC sub-channelization.

9. The mobile station of claim 7, wherein the one or more DRUs of the IEEE802.16m system are obtained by tile permutation.

10. A base station configured to wirelessly communicate with plural mobile stations in an Institute of Electrical and Electronics Engineers (IEEE) 802.16m system, the base station comprising:

a RF unit; and a processor operatively connected to the RF unit and configured to transmit information via a control channel of a super-frame to the plural mobile stations, the information being related to an IEEE802.16e system, and to receive signals via one or more tiles in a set of Orthogonal Frequency Division Multiple Access (OFDMA) symbols, the one or more tiles being related to the IEEE802.16e system or the IEEE802.16m system, when the information indicates that the IEEE802.16e system is supported, wherein, within the set of OFDMA symbols, one or more Partial Usage of Sub-Channels (PUSC) sub-channels of the IEEE802.16e system and one or more Distributed Resource Units (DRUs) of the IEEE802.16m system are frequency division multiplexed, wherein each PUSC sub-channel is based on a tile of $X_1$ contiguous subcarriers and $Y_1$ contiguous OFDMA symbols, wherein each DRU is based on a tile of $X_2$ contiguous subcarriers and $Y_2$ contiguous OFDMA symbols, the tile of $X_2$ contiguous subcarriers and $Y_2$ contiguous OFDMA symbols being obtained by an extension of the tile of $X_1$ contiguous subcarriers and $Y_1$ contiguous OFDMA symbols in a time domain, wherein $X_1=X_2=4$, $Y_1=3$, and $Y_2=6$, and wherein the set of OFDMA symbols consist of 6 OFDMA symbols.

11. The base station of claim 10, wherein the one or more PUSC sub-channels of the IEEE802.16e system are obtained by PUSC sub-channelization.

12. The base station of claim 10, wherein the one or more DRUs of the IEEE802.16m system are obtained by tile permutation.

* * * * *